United States Patent
Lee (10) Patent No.: US 8,406,227 B2
(45) Date of Patent: Mar. 26, 2013

(54) HYBRID WIRED AND WIRELESS COMMUNICATION SYSTEM AND A COMMUNICATION METHOD THEREOF

(75) Inventor: Jin-taek Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1586 days.

(21) Appl. No.: 10/866,022

(22) Filed: Jun. 14, 2004

(65) Prior Publication Data

US 2004/0258051 A1    Dec. 23, 2004

(30) Foreign Application Priority Data

Jun. 19, 2003    (KR) .................. 10-2003-0039890

(51) Int. Cl.
H04W 40/24    (2009.01)
H04L 12/64    (2006.01)
H04L 12/66    (2006.01)

(52) U.S. Cl. .................. 370/389; 370/352; 370/401

(58) Field of Classification Search .......... 370/389–392, 370/352, 401
See application file for complete search history.

(56) References Cited

U.S. PATENT DOCUMENTS

| | | | | |
|---|---|---|---|---|
| 5,172,372 A * | 12/1992 | Konishi | .................. | 370/401 |
| 5,452,291 A * | 9/1995 | Eisenhandler et al. | ........ | 370/402 |
| 5,796,727 A | 8/1998 | Harrison et al. | | |
| 5,812,531 A * | 9/1998 | Cheung et al. | ................. | 370/255 |
| 5,953,507 A | 9/1999 | Cheung et al. | | |
| 5,959,968 A * | 9/1999 | Chin et al. | .................... | 370/216 |
| 5,983,098 A * | 11/1999 | Gerszberg et al. | ......... | 455/426.1 |
| 6,115,385 A * | 9/2000 | Vig | ................................. | 370/401 |
| 6,128,654 A * | 10/2000 | Runaldue et al. | ............. | 709/219 |
| 6,185,214 B1 * | 2/2001 | Schwartz et al. | ............. | 370/401 |
| 6,189,042 B1 | 2/2001 | Keller-Tuberg | | |
| 6,338,087 B1 | 1/2002 | Okanoue | | |
| 6,473,400 B1 * | 10/2002 | Manning | ....................... | 370/229 |
| 6,718,383 B1 * | 4/2004 | Hebert | .......................... | 709/224 |
| 7,145,866 B1 * | 12/2006 | Ting et al. | ..................... | 370/225 |
| 2002/0012352 A1 * | 1/2002 | Hansson et al. | ............. | 370/401 |
| 2002/0061009 A1 | 5/2002 | Sorensen | | |

(Continued)

FOREIGN PATENT DOCUMENTS

CN    1391384 A    1/2003
EP    1 091 532    10/2001

(Continued)

OTHER PUBLICATIONS

Office Action mailed May 12, 2006 of the corresponding Chinese Patent Application No. 200410068422.9.

(Continued)

*Primary Examiner* — Chi Pham
*Assistant Examiner* — Ahmed Elallam
(74) *Attorney, Agent, or Firm* — Staas & Halsey LLP (57) ABSTRACT

A communication method for a hybrid wired and wireless communication system includes registering an entry comprising a physical address of a source transmitting a received packet and an identifier indicating a wired or wireless network interface linked to the physical address in a predetermined management list; receiving a transmission packet from an upper layer and determining whether a physical address identical with a destination physical address of the transmission packet is present in the management list; and when the destination physical address is present in the management list, transmitting the transmission packet through either of the wired network interface and the wireless network interface according to the identifier.

10 Claims, 7 Drawing Sheets

U.S. PATENT DOCUMENTS

| | | | |
|---|---|---|---|
| 2002/0196761 A1 | 12/2002 | Kaneko | |
| 2003/0035399 A1 | 2/2003 | Ishibashi et al. | |
| 2003/0051052 A1* | 3/2003 | Shteyn et al. | 709/245 |
| 2003/0065816 A1 | 4/2003 | Dharmadhikari et al. | |
| 2003/0131131 A1* | 7/2003 | Yamada et al. | 709/238 |
| 2004/0042424 A1* | 3/2004 | Hsien-Tsung | 370/328 |
| 2004/0141511 A1* | 7/2004 | Rune et al. | 370/401 |
| 2004/0266424 A1* | 12/2004 | Park et al. | 455/426.1 |

FOREIGN PATENT DOCUMENTS

| | | |
|---|---|---|
| EP | 1 265 420 | 5/2002 |
| JP | 5-327715 | 12/1993 |
| JP | 6-335046 | 12/1994 |
| JP | 10-117208 | 5/1998 |
| JP | 10-190717 | 7/1998 |
| JP | 11-41272 | 2/1999 |
| JP | 2001-136172 | 5/2001 |
| JP | 2003-46514 | 2/2003 |

OTHER PUBLICATIONS

Japanese Office Action dated Sep. 14, 2010, issued in Japanese Patent Application No. 2004-182790.

Japanese Office Action dated Feb. 16, 2010 issued in Japanese Patent Application No. 2004-182790.

Japanese Office Action dated Nov. 22, 2011 issued in corresponding Japanese Patent Application No. 2011-006463.

* cited by examiner

| ENTRY NUMBER | PHYSICAL ADDRESS | INTERFACE IDENTIFIER | TIMER | TYPE |
|---|---|---|---|---|
| 1 | xx-xx-xx-xx-xx-xx | 2 | 15 | VALID |
| 2 | xx-xx-xx-xx-xx-xx | 2 | 10 | VALID |
| 3 | xx-xx-xx-xx-xx-xx | 1 | 0 | INVALID |
| 4 | xx-xx-xx-xx-xx-xx | 2 | 0 | INVALID |

HYBRID WIRED AND WIRELESS COMMUNICATION SYSTEM AND A COMMUNICATION METHOD THEREOF

CROSS-REFERENCE TO RELATED APPLICATION

This application claims the priority of Korean Patent Application No. 2003-39890, filed on Jun. 19, 2003 in the Korean Intellectual Property Office, the disclosure of which is incorporated herein by reference.

BACKGROUND OF THE INVENTION

1. Field of the Invention

The present invention relates to a hybrid wired and wireless communication system capable of performing both wired communication and wireless communication using a single physical address, and a communication method thereof.

2. Description of the Related Art

Generally, a hybrid wired and wireless communication system includes a central processing unit (CPU), a read-only memory (ROM), a random-access memory (RAM), a peripheral device interface that can be connected to peripheral devices, a wired network interface that can be connected to a wired network, a wireless network interface that can be connected to a wireless network, and protocol modules that can communicate with the wired network interface and the wireless network interface, respectively, all of which communicate across a bus.

To implement networking in a local area network (LAN) using the hybrid system, a network interface card (NIC) is required. The NIC includes a physical device (PHY) that is connected to an actual physical media and can perform transmission/reception of a signal, and a media access control (MAC) module that performs MAC with respect to a medium using the PHY. The MAC module operates based on a physical address used to communicate with another device in a network. A physical address allocated to the NIC is stored in a ROM such as an electrically erasable programmable ROM (EEPROM) or a non-volatile RAM (NVRAM) in a system.

A LAN driver performs packet transmission/reception through a network and is present in an upper layer above the NIC. The LAN driver is connected to a protocol module in an upper protocol layer, which performs packet flow control and packet transfer, via a network driver interface. The NIC includes a wired MAC with associated PHY and a wireless MAC with associated PHY. The protocol layer includes TCP/IP and IPX/SPX protocols. A connection is secured using socket layer for protocols such as HTTP, FTP, and POP 3.

The NIC has a 48-bit fixed physical address, and the protocol module uses a logical address such as an Internet Protocol (IP) address to designate an address. The physical address and the logical address allow the system to be identified in the network. The physical address is stored in an area such as ROM in the system during manufacturing and is transmitted to the MAC module during system initialization.

In an Ethernet frame, a destination physical address indicates a MAC address of a host to receive data. A source physical address indicates a MAC address of a host transmitting the data. Here, in each of the destination and source physical addresses which comprise 48 bits, respectively, if a first bit is 0, the data is unicast (i.e., transmitted to only one receiving host in the network). If the first bit is 1, the data is multicast (i.e., transmitted to only certain hosts in the network). If all of the 48 bits are 1, the data is broadcast to all of hosts in the network. Also included are a frame type and a frame check sequence (FCS).

Before the data is transmitted through the network, an address used in a current layer is embedded into a header of a packet. A receiving party analyzes the address embedded into the header and determines whether the data has been received correctly. If the address embedded into the header is not identical with the receiving party's address, the receiving party does not receive the packet or discards the received packet without processing it.

In a system connected to a network, a packet received via an NIC is transmitted to an application program via a protocol module of a layer bound with the NIC. Data generated in the application program is transmitted to the network via the protocol module and the NIC.

A wireless network interface may be set in an infrastructure mode or an ad-hoc mode. In the ad-hoc mode, a host can communicate with another host wirelessly in a network. In the infrastructure mode, a host can be interlocked with another network via an access point (AP).

Specifically, when a hybrid wired and wireless communication system wirelessly communicates with another communication system through the AP, the wireless communication mode in which the hybrid wired and wireless communication system wirelessly communicates with other types of communication systems not directly but via the AP or the like is referred to as the infrastructure mode. In contrast, when the hybrid wired and wireless communication system wirelessly communicates with the another communication system directly not via the AP, the wireless communication mode is referred to as the ad-hoc mode.

As described above, the hybrid wired and wireless communication system can be simultaneously connected to a wired network and a wireless network by using individual wired and wireless network interfaces. Here, each network interface needs a physical address identifying the network interface in a network. In other words, the hybrid wired and wireless communication system has two or more MAC modules, and two or more physical addresses allocated to the two or more MAC modules, respectively.

To overcome this disadvantage, a hybrid wired and wireless communication system using a single physical address has been introduced. Such hybrid wired and wireless communication system includes individual MAC modules, but stores only one physical address in an associated memory. Further, the system allocates the same physical address to the individual MAC modules. In such a structure, since the individual MAC modules use the same physical address, they are recognized as the same unit by other devices on a network. Accordingly, when the hybrid wired and wireless communication system using a single physical address is connected to a wired network and the wireless network interface operates in the infrastructure mode, a double link is made. Therefore, packet transmission/reception through the wireless network interface is interrupted.

However, when the wireless network interface operates in the ad-hoc mode, packet transmission/reception through the wireless network interface can be performed even though the hybrid wired and wireless communication system is connected to the wired network. While usable, when the hybrid wired and wireless communication system using a single physical address is connected to the wired network and its wireless network interface operates in the ad-hoc mode, a protocol module in an upper layer above the NIC cannot determine a network interface through which a packet will be transmitted. As a result, the hybrid wired and wireless communication system transmits data through both of the wired and wireless network interfaces, and a packet is redundantly transmitted through the wired and wireless networks. Consequently, traffic of one network is loaded onto another network, which causes unnecessary dissipation of a bandwidth.

SUMMARY OF THE INVENTION

An aspect of the present invention provides a hybrid wired and wireless communication system which is connected to a wired network and a wireless network using a single physical address and prevents traffic of one network from being loaded onto another network when the system is connected to a wired network and simultaneously a wireless network interface of the system operates in an ad-hoc mode, thereby preventing unnecessary dissipation of a bandwidth, and a communication method thereof.

According to an aspect of the present invention, there is provided a communication method for a hybrid wired and wireless communication system capable of communicating by wire and wirelessly in a local area network, the communication method comprising: registering an entry comprising a physical address of a source transmitting a received packet and an identifier indicating a wired or wireless network interface linked to the physical address in a predetermined management list; receiving a transmission packet from an upper layer and determining whether a physical address identical with a destination physical address of the transmission packet is present in the management list; and when the destination physical address is present in the management list, transmitting the transmission packet through either of the wired network interface and the wireless network interface according to the identifier.

According to an aspect of the present invention, the entry further comprises a timer indicating duration from generation to removal of the entry in the management list.

According to an aspect of the present invention, the registering of the entry comprises: determining whether the source physical address of the received packet is present in the management list; when the source physical address is not present in the management list, registering the source physical address and the identifier in the management list; transmitting the received packet to the upper layer; and determining whether a new packet has been received through either of the wired network interface and the wireless network interface and repeating the determining of whether the source physical address is present, the registering of the source physical address and the identifier, and the transmitting of the received packet.

According to an aspect of the present invention, the entry further comprises a timer indicating the duration from generation to removal of the entry in the management list, and wherein the determining of whether the source physical address is present comprises resetting the timer to a predetermined initial value when it is determined that the source physical address of the received packet is present in the management list.

According to an aspect of the present invention, the operation of receiving the transmission packet and determining whether the physical address identical with the destination physical address of the transmission packet is present comprises: receiving the transmission packet from the upper layer and determining whether a type of the destination physical address indicates a unicast transmission; and transmitting the transmission packet through both of the wired network interface and the wireless network interface when it is determined that the type of the destination physical address does not indicate the unicast transmission and determining whether the physical address is identical with the destination physical address of the transmission packet is present in the management list when it is determined that the type of the destination physical address indicates the unicast transmission.

According to another aspect of the present invention, there is provided a hybrid wired and wireless communication system capable of communicating by wire and wirelessly in a local area network, the hybrid wired and wireless communication system comprising: a storage unit storing a management list comprising a plurality of entries, each of the entries comprising a physical address of a source transmitting a received packet and an identifier indicating a wired or wireless network interface linked to the physical address; a management module determining whether a physical address identical with a source physical address included in a received packet is present in the management list, registering the physical address and an identifier corresponding to the physical address in the management list when it is determined that the physical address is not present in the management list, and transmitting the received packet to an upper layer; a control module receiving a transmission packet from the upper layer and selectively transmitting the transmission packet through the corresponding one of the wired network interface and the wireless network interface according to an identifier corresponding to a destination physical address of the transmission packet when the destination physical address is present in the management list; and a wired network interface and a wireless network interface transmitting the received packet to the management module, receiving the transmission packet from the control module, and transmitting the transmission packet to networks, respectively, connected thereto.

According to an aspect of the present invention, the entry further comprises a timer indicating the duration from generation to removal of the entry in the management list.

According to an aspect of the present invention, the control module checks a type of the destination physical address of the transmission packet received from the upper layer, transmits the transmission packet through both of the wired network interface and the wireless network interface when the type of the destination physical address does not indicate a unicast transmission, and determines whether a physical address identical with the destination physical address is present in the management list when the type of the destination physical address indicates the unicast transmission.

According to an aspect of the present invention, the control module transmits the transmission packet through both of the wired network interface and the wireless network interface when the destination physical address is not present in the management list.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent and more readily appreciated by describing in detail embodiments thereof with reference to the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. Hereinafter, embodiments of the present invention will be described in detail with reference to the attached drawings to explain aspects of the present invention.

Figure 1:
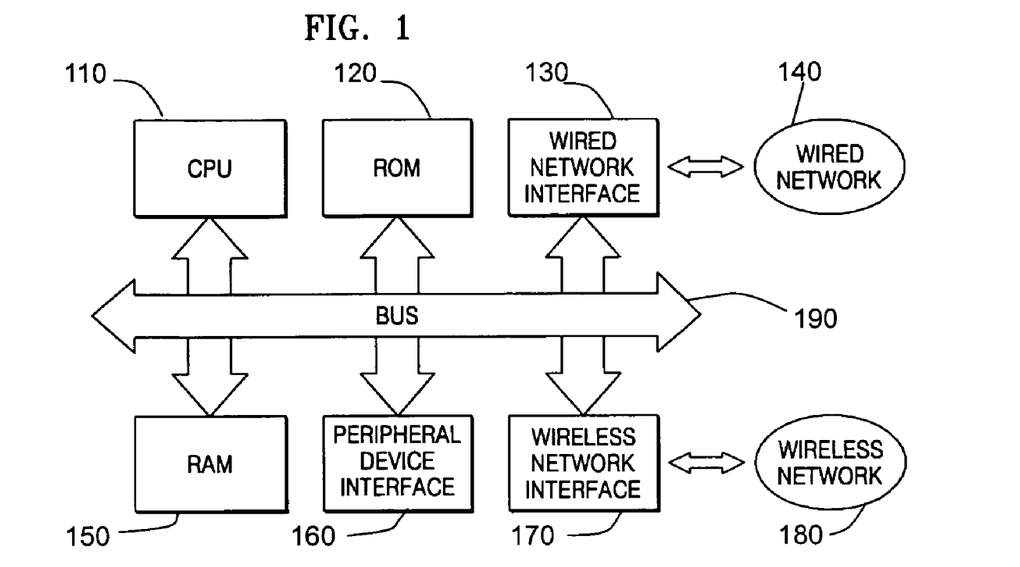
FIG. 1 is a block diagram of a hybrid wired and wireless communication system.

As show in FIG. 1, a hybrid wired and wireless communication system includes a central processing unit (CPU) 110, a read-only memory (ROM) 120, a random-access memory (RAM) 150, a peripheral device interface 160 that can be connected to peripheral devices (not shown), a wired network interface 130 that can be connected to a wired network 140, a wireless network interface 170 that can be connected to a wireless network 180, and protocol modules that can communicate with the wired network interface 130 and the wireless network interface 170, respectively, all of which communicate across a bus 190.

To implement networking in a local area network (LAN) using the system of FIG. 1, a network interface card (NIC) is required. The NIC includes a physical device (PHY) that is connected to an actual physical media and can perform transmission/reception of a signal, and a media access control (MAC) module that performs MAC with respect to a medium using the PHY. The MAC module operates based on a physical address used to communicate with another device in a network. A physical address allocated to the NIC is stored in a ROM such as an electrically erasable programmable ROM (EEPROM) or a non-volatile RAM (NVRAM) in a system.

Figure 2:
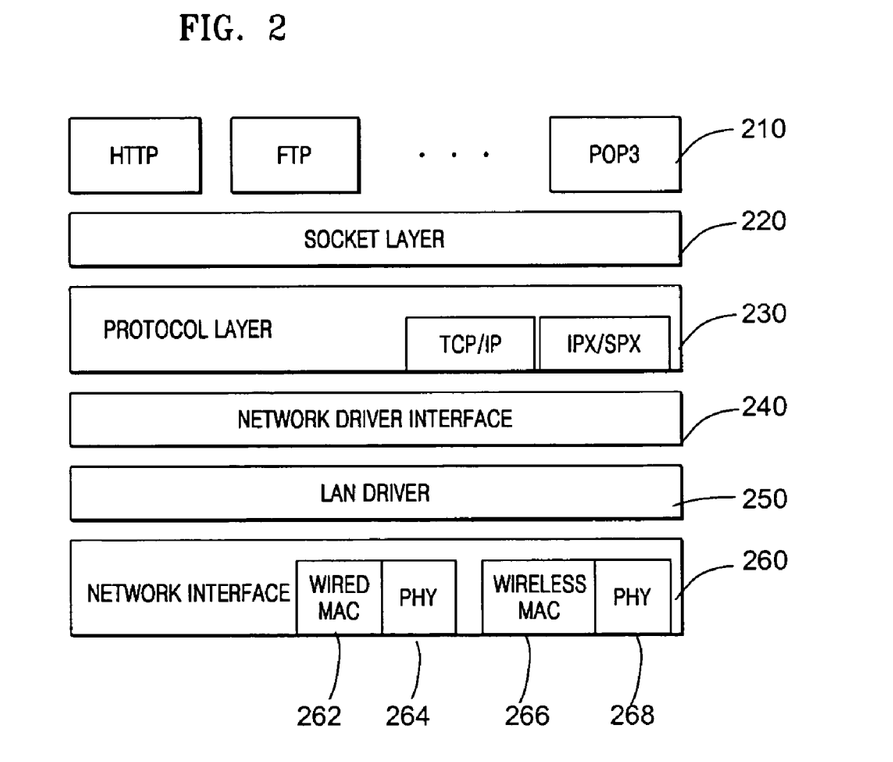
FIG. 2 is a block diagram of a network system.

Referring to FIG. 2, a LAN driver 250 performing packet transmission/reception through a network is present in an upper layer above the NIC 260. The LAN driver 250 is connected to a protocol module in an upper protocol layer 230, which performs packet flow control and packet transfer, via a network driver interface 240. As shown, the NIC 260 includes a wired MAC 262 with associated PHY 264 and a wireless MAC 266 with associated PHY 268. In the shown embodiment, the protocol layer 230 includes TCP/IP and IPX/SPX protocols. A connection is secured using socket layer 220 for protocols 210 such as HTTP, FTP, and POP 3.

The NIC 260 has a 48-bit fixed physical address, and the protocol module in layer 230 uses a logical address such as an Internet Protocol (IP) address to designate an address. The physical address and the logical address allow the system to be identified in the network. The physical address is stored in an area such as ROM 120 in the system during manufacturing and is transmitted to the MAC module 262, 266 during system initialization.

Figure 3:
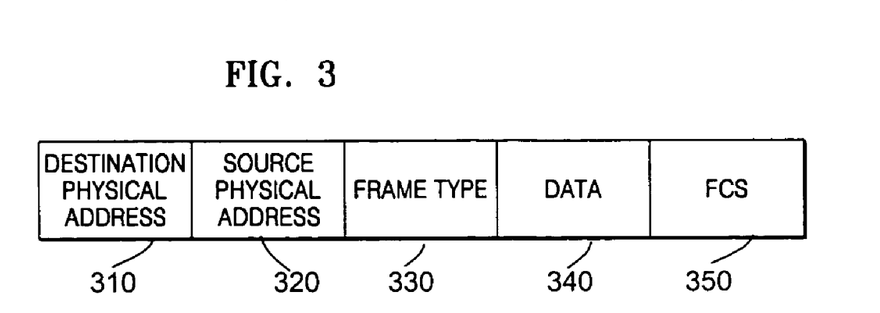
FIG. 3 illustrates a structure of an Ethernet frame.

FIG. 3 illustrates a structure of an Ethernet frame. Referring to FIG. 3, a destination physical address 310 in the Ethernet frame indicates a MAC address of a host to receive data 340. A source physical address 320 indicates a MAC address of a host transmitting the data 340. Here, in each of the destination and source physical addresses 310, 320 which comprise 48 bits, respectively, if a first bit is 0, the data 340 is unicast (i.e., transmitted to only one receiving host in the network). If the first bit is 1, the data 340 is multicast (i.e., transmitted to only certain hosts in the network). If all of the 48 bits are 1, the data 340 is broadcast to all of hosts in the network. Also included are a frame type 330 and a frame check sequence (FCS) 350.

Before the data is transmitted through the network, an address used in a current layer is embedded into a header of a packet. A receiving party analyzes the address embedded into the header and determines whether the data has been received correctly. If the address embedded into the header is not identical with the receiving party's address, the receiving party does not receive the packet or discards the received packet without processing it.

In a system connected to a network, a packet received via an NIC 260 is transmitted to an application program via a protocol module of a layer 230 bound with the NIC 260. Data generated in the application program is transmitted to the network via the protocol module 230 and the NIC 260.

A wireless network interface may be set in an infrastructure mode or an ad-hoc mode. In the ad-hoc mode, a host can communicate with another host wirelessly in a network. In the infrastructure mode, a host can be interlocked with another network via an access point (AP).

Figure 4A:
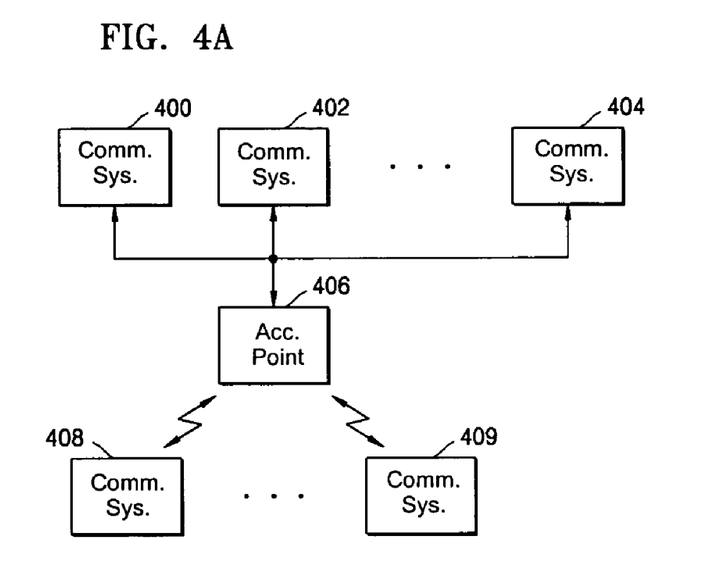
FIG. 4A illustrates a network in an infrastructure mode.

Operations in the ad-hoc mode and in the infrastructure mode will be described with reference to FIGS. 4A and 4B below. FIG. 4A illustrates a network in the infrastructure mode. The network includes communication systems 400, 402, 404, 408, and 409 and an AP 406 as shown in FIG. 1.

Among the communication systems 400, 402, 404, 408, and 409 shown in FIG. 4A, one is a hybrid wired and wireless communication system, and the others are other types of communication systems that can communicate by wire and wirelessly with the hybrid wired and wireless communication system of FIG. 1. For example, where the communication system 408 is the hybrid wired and wireless communication system, when the hybrid wired and wireless communication system 408 wirelessly communicates with the communication system 402, the hybrid wired and wireless communication system 408 wirelessly communicates with the AP 406, and then communicates with the communication system 402 via the AP 406. Meanwhile, where the communication system 400 is the hybrid wired and wireless communication system of FIG. 1, the hybrid wired and wireless communication system 400 communicates by wire with the communication systems 402 and 404, and wirelessly communicates with communication systems 408 and 409 via the AP 406.

As described above in FIG. 4A, a wireless communication mode in which the hybrid wired and wireless communication system wirelessly communicates with other types of communication systems not directly but via the AP 406 or the like is referred to as the infrastructure mode.

Figure 4B:
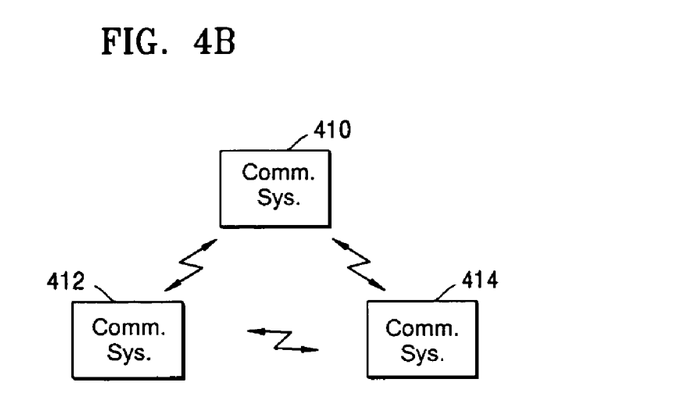
FIG. 4B illustrates a network in an ad-hoc mode.

FIG. 4B illustrates a network in the ad-hoc mode. The network includes communication systems 410, 412, and 414. Among the communication systems 410, 412, and 414 shown in FIG. 4B, one is the hybrid wired and wireless communication system of FIG. 1, and the others are other types of communication systems that can communicate by wire and wirelessly with the hybrid wired and wireless communication system. For example, when a hybrid wired and wireless communication system 410 wirelessly communicates with the other communication systems 412 and 414, the hybrid wired and wireless communication system 410 wirelessly communicates with the other communication systems 412 and 414 directly, not via the AP 406 shown in FIG. 4A or the like. As described above, a wireless communication mode in which a hybrid wired and wireless communication system wirelessly communicates with another communication system directly without requiring a relay, such as the AP 406, is referred to as the ad-hoc mode.

As described above, the hybrid wired and wireless communication system can be simultaneously connected to a wired network 140 and a wireless network 180 by using individual wired and wireless network interfaces 130, 170 as shown in FIG. 1. Here, each network interface 260 shown in FIG. 2 needs a physical address identifying the network interface in a network. In other words, the hybrid wired and wireless communication system shown in FIGS. 1 and 2 has two or more MAC modules 262, 266 using a single physical address.

Figure 5:
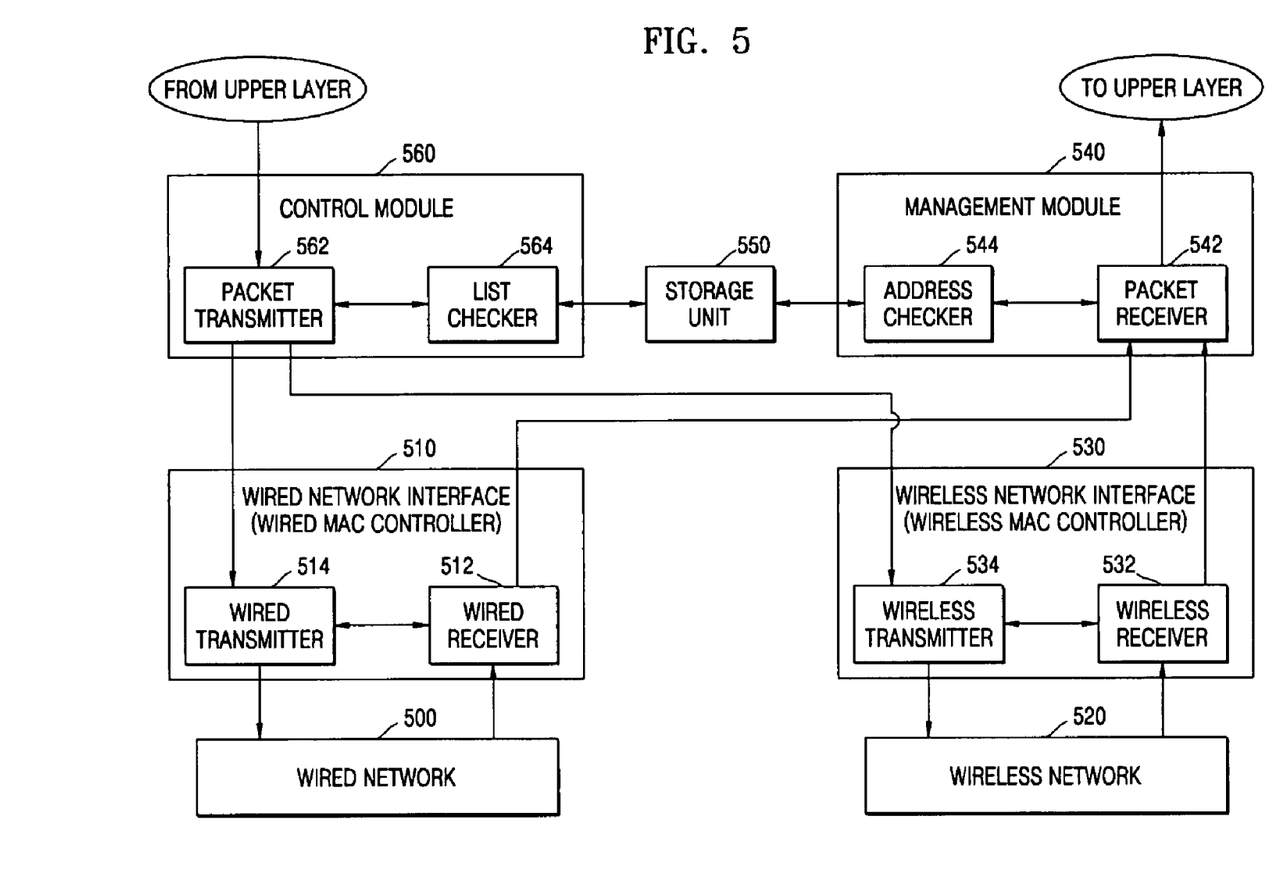
FIG. 5 is a block diagram of a hybrid wired and wireless communication system according to an embodiment of the present invention.

Referring to FIG. 5, a hybrid wired and wireless communication system includes a wired network interface 510 connected to a wired network 500, a wireless network interface 530 connected to a wireless network 520, a management module 540, a storage unit 550, and a control module 560. The management module 540 receives packets through the wired network interface 510 and the wireless network interface 530, registers a physical address of a source of a received packet in a management list, and transmits the received packet to an upper layer. The storage unit 550 stores and updates the management list including a plurality of management entries. Each of the entries includes a physical address of a destination of a received packet and an interface number indicating which of the wired network interface 510 or the wireless network interface 530 is linked to the physical address. The control module 560 receives a transmission packet from an upper layer, checks whether a physical address of a source of the transmission packet is present in the management list stored in the storage unit 550, and selectively transmits the transmission packet through the wired or wireless network interface 510 or 530 according to an interface number linked to the physical address in the management list when the physical address is present in the management list. The management module 540 and the control module 560 are implemented on a local area network (LAN) driver shown in FIG. 2, which is easily understood by those skilled in the art. While not shown, it is understood that the CPU 110, ROM 120, Interface 160, RAM 150, and/or BUS 190 of FIG. 1 are included in the system shown in FIG. 5 according to an aspect of the invention. But it is understood that the system can be otherwise configured and/or used with the network types beyond LAN, such as wide area networks (WAN), public and private networks such as the internet and intranets, and/or in any communication medium by which a device connected to the network utilizes identification for transmission and/or reception of data.

Figure 6:
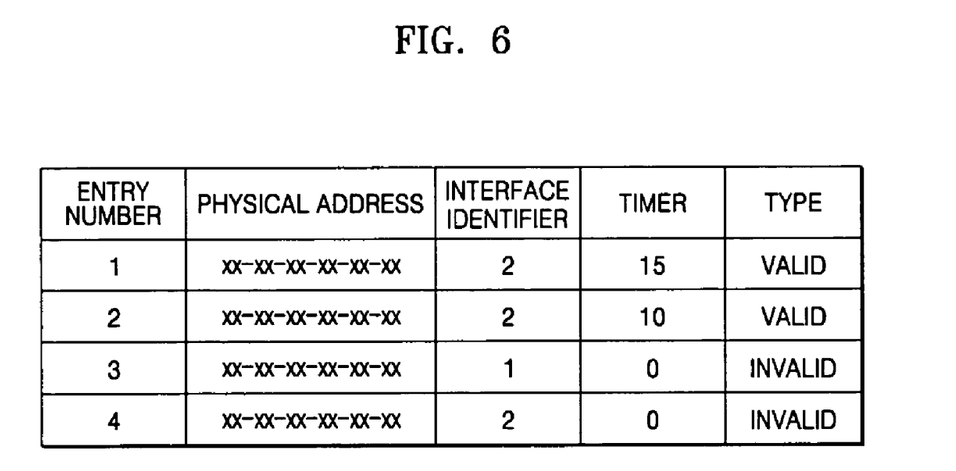
FIG. 6 illustrates a structure of a management list according to an embodiment of the present invention.

FIG. 6 illustrates a structure of a management list stored in unit 550 according to an embodiment of the present invention. Referring to FIG. 6, the management list includes a physical address item, an interface number item, and a timer item. The shown management list further includes a type item indicating whether an entry is valid or invalid according to the timer item but, need not include the type and/or validity entry in all aspects of the invention. Further, it is understood that the management list could include additional information, and that items in the management list could be combined to reduce the number of entries according to aspects of the invention.

A physical address in the management list indicates a media access control (MAC) address of a source that has transmitted a received packet included in the packet frame shown in FIG. 3. In the shown embodiment of the present invention, the physical address is 48 bits in length. However, it is understood that the physical address can have other lengths and formats.

An interface number in the management list is an identifier indicating either the wired network interface 510 or the wireless network interface 530 that the received packet has been received through. In other words, the interface number indicates a network interface linked to the physical address. As shown, the identifier number "2" indicates the wired interface 510, and the identifier number "1" indicates the wireless interface 530.

An aspect of the present invention is proposed to prevent unnecessary traffic from occurring since a transmission packet is transmitted through both of the wired and wireless network interfaces 510 and 530 when a wireless communication mode is the ad-hoc mode in a case where wired and wireless MAC interfaces 262, 266 share the single physical address that otherwise occurs. Specifically, to prevent the occurrence of unnecessary traffic and other such problems, whenever a packet is received, the management list records a physical address of a source transmitting the packet and an interface number indicating whether a network interface linked to the physical address is wired or wireless. When a transmission packet generated in an upper layer is to be transmitted to a physical address corresponding to a physical address in the management list, the transmission packet is transmitted through the corresponding indicated one of the wired network interface 510 and the wireless network interface 530 according to the interface number linked to the physical address in the management list. Accordingly, the physical address item and the interface number item are essential to the management list in the embodiment shown in FIG. 6. But it is understood that, if the physical address and identifier can be otherwise combined or where the identifier of the interface 510, 530 can be otherwise correlated or conveyed using a single entry and/or other entry, the management list need not include both the physical address and the identifier in the form shown in FIG. 6.

A timer indicates a duration from a generation of the entry when the physical address is added to the management list to a removal of the entry in the management list. A type indicates whether an entry is valid and remains in the management list, or is invalid and is to be removed from the management list. It is understood that the type can also indicate other information of interest, and that the type need not be used, such as if the system removes the entry as soon as the duration indicates that the entry is to be removed.

In the shown embodiment of the present invention, to increase storage efficiency of the management list, a time during which an entry is stored in the management list is set. In detail, the timer item is included in the management list, and an initial value of the timer item is set. Thereafter, a value of the timer item is increased or decreased, and when a predetermined time lapses, an entry having an expiring timer is removed from the management list. Before a timer expires, if a packet is received from a physical address corresponding to the timer, the timer is re-initialized. When a timer expires, a corresponding type is set to be invalid indicating that the entry is to be deleted, and the system deletes the entry. Otherwise, the type is set to be valid, indicating that the entry is to remain. But it is understood that the timer and/or type fields need not be used in all aspects of the invention, such as where a record of transmission and/or reception is desired.

Figure 7:
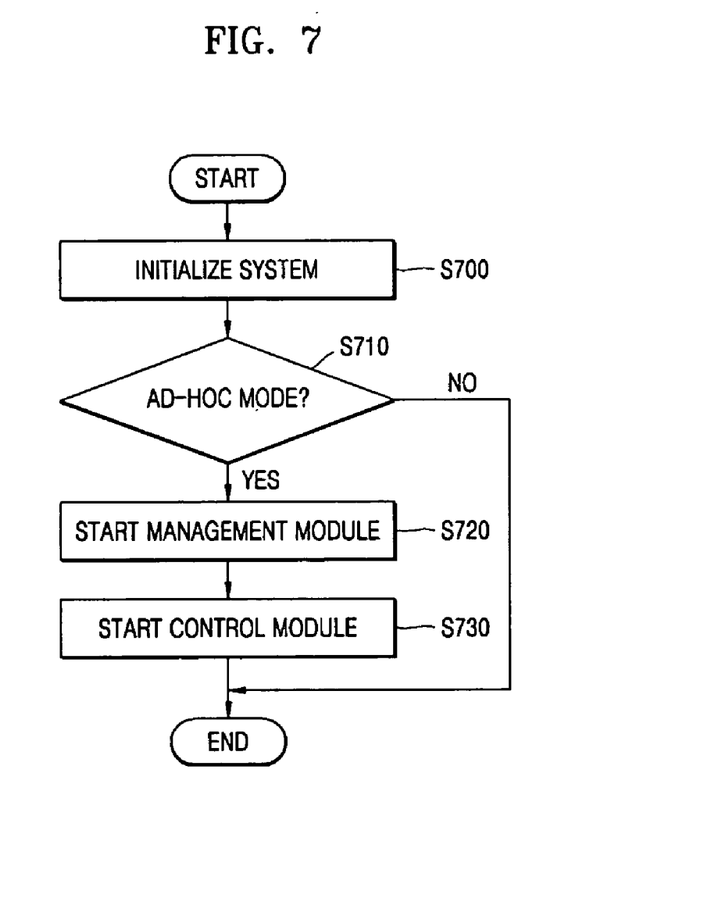
FIG. 7 is a flowchart of a system initialization procedure according to an embodiment of the present invention.

FIG. 7 is a flowchart of a system initialization procedure according to an embodiment of the present invention. When a hybrid wired and wireless communication system is supplied with electric power and is booted, the system is initialized is in operation S700. In the system initialization, a single physical address stored in a memory unit (not shown) is transmitted to the LAN driver including the management module 540 and the control module 560. The LAN driver allocates the physical address to each network interface 510, 530 of the hybrid wired and wireless communication system to initialize a MAC module and then initializes a transmitter and a receiver of each network interface 510, 530.

After the system initialization in operation S700, the LAN driver checks an operating mode and state of the wired network interface 510 and the wireless network interface 530, and particularly checks whether the wireless communication mode is the ad-hoc mode (in operation S710). When the wireless communication mode is the ad-hoc mode, the management module 540 is started in operation S720, and the control module 560 is started in operation S730. When the wireless communication mode is not the ad-hoc mode, operations S720 and S730 are not performed.

Figure 8:
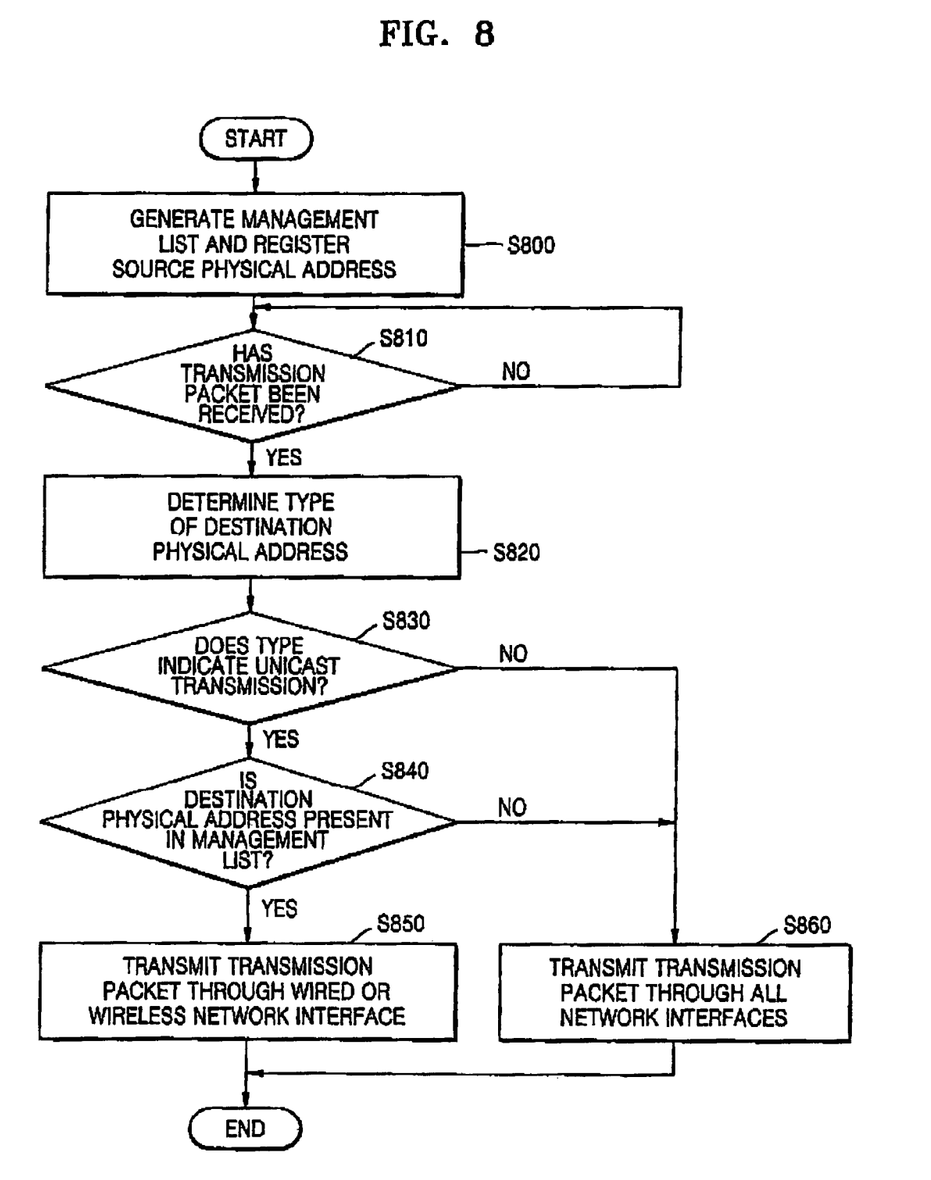
FIG. 8 is a flowchart of a communication method when a wireless communication mode is the ad-hoc mode, according to an embodiment of the present invention.

FIG. 8 is a flowchart of a communication method when a wireless communication mode is the ad-hoc mode according to an embodiment of the present invention. Referring to FIG. 8, the management module 540 generates the management list shown in FIG. 6 using a received packet and registers a source physical address included in the received packet in the management list in operation S800. An embodiment of operation S800 will be described in detail with further reference to FIG. 9 below.

Figure 9:
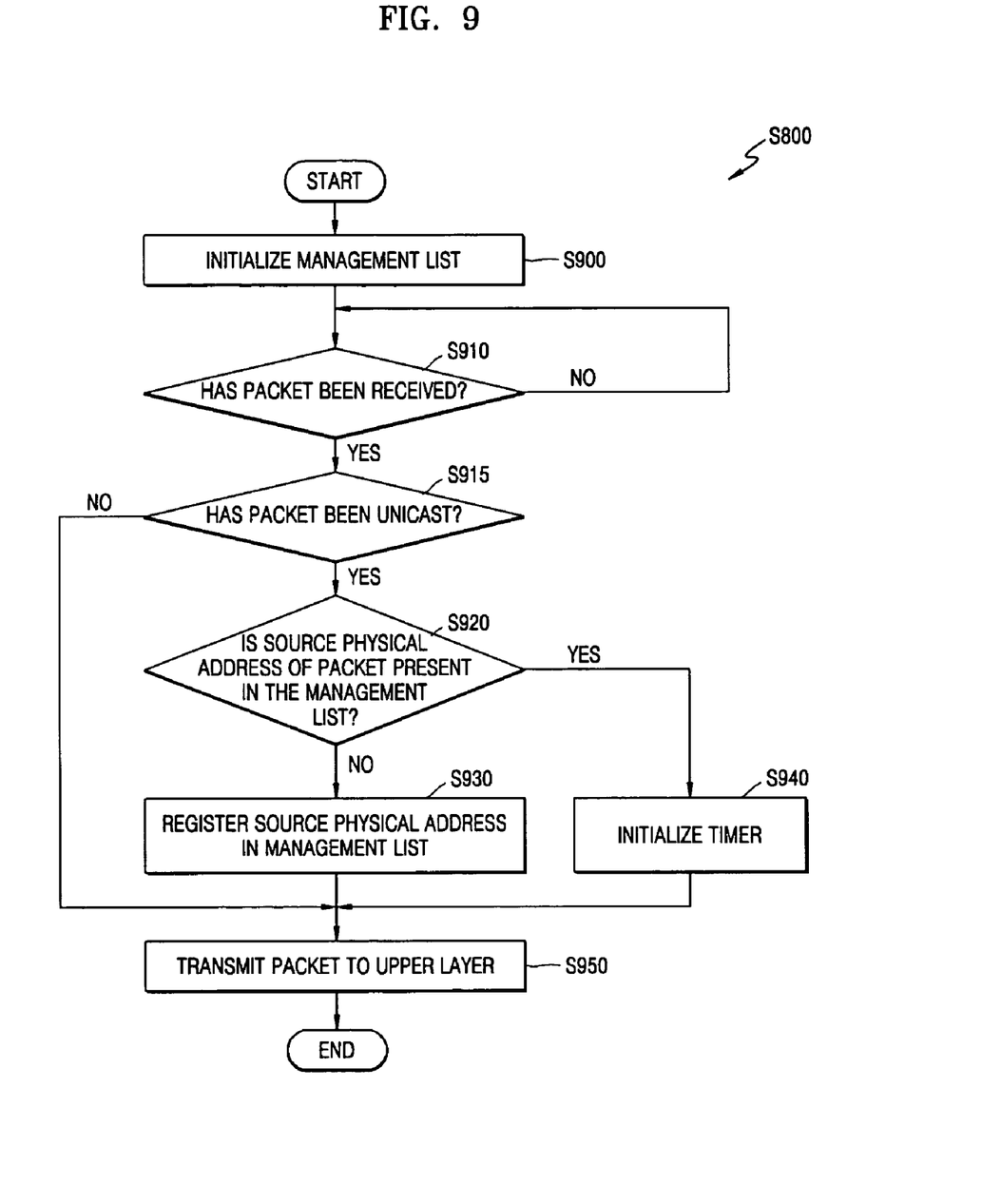
FIG. 9 is a detailed flowchart of an operation of generating a management list and registering a physical address shown in FIG. 8.

When a hybrid wired and wireless communication system is started and the management module 540 is started in the ad-hoc mode, the storage unit 550 initializes the management list in operation S900. Thereafter, a packet receiver 542 included in the management module 540 determines whether a packet has been received from a wired receiver 512 included in the wired network interface 510 or a wireless receiver 532 included in the wireless network interface 530 in operation S910. If it is determined that a packet has been received, an address checker 544 included in the management module 540 checks a source physical address included in the received packet to determine whether the source physical address indicates a unicast transmission in operation S915.

If the source physical address indicates broadcast or multicast transmission, the address checker 544 just transmits the received packet to an upper layer in operation S950 without performing operations S930 or S920. If the source physical address indicates the unicast transmission, the address checker 544 determines with reference to the storage unit 550 whether the source physical address, (i.e., the source MAC address is present in the management list) in operation S920. It is understood, however, that operation S915 need not be performed such that operation S920 is performed regardless of whether the packet is unicast, broadcast, and/or multicast, and that operation S915 can be performed only for selected ones of the unicast, multicast, and/or broadcast and not for non-selected ones of the unicast, multicast, and broadcast.

If the source physical address is not present in the management list, the management module 540 registers the source physical address and an interface number indicating a network interface linked to the source physical address in the management list stored in the storage unit 550 in operation S930. By way of example, in the management list shown in FIG. 6, when the wireless network interface 530 is linked to the source physical address, the interface number is set to "1", and when the wired network interface 510 is linked to the source physical address, the interface number is set to "2". In addition, the management module 540 sets a timer to an initial value in operation S930 and transmits the received packet to the upper layer in operation S950.

Meanwhile, if the source physical address is present in the management list, the storage unit 550 initializes to the initial value a timer corresponding to the source physical address in operation S940 and the management module 540 transmits the received packet to the upper layer in operation S950.

Referring back to FIG. 8, after the management list is generated, the control module 560 is started and a packet transmitter 562 included in the control module 560 determines whether a packet to be transmitted to a network has been received from the upper layer in operation S810. If the packet transmitter 562 has received the transmission packet from the upper layer, a list checker 564 included in the control module 560 checks the transmission packet to determine a type of a destination physical address included in the transmission packet in operation S820, and whether the type of a destination physical address included in the transmission packet indicates unicast transmission, multicast transmission, or broadcast transmission in operation S830. But it is understood that operations S820 and S830 do not need to be performed in all aspects of the invention.

If the type of the destination physical address indicates the multicast or broadcast transmission, the packet transmitter transmits the transmission packet to both of the wired transmitter 514 and the wireless transmitter 534 so that the transmission packet is transmitted to both of the wired network 500 and the wireless network 520 in operation S860. If the type of the destination physical address indicates the unicast transmission, the list checker 564 determines referring to the storage unit 550 whether the destination physical address of the transmission packet is present in the management list in operation S840.

If the destination physical address of the transmission packet is present in the management list, the packet transmitter 562 transmits the transmission packet to the destination address through the wired network interface 510 or the wireless network interface 530 according to an interface number corresponding to the destination physical address in the management list in operation S850. In detail, when the interface number indicates the wired network interface 510, the packet transmitter 562 transmits the transmission packet to the wired transmitter 514 without transmitting through the wireless transmitter 534. When the interface number indicates the wireless network interface 530, the packet transmitter 562 transmits the transmission packet to the wireless transmitter 534 without transmitting through the wired transmitter 514.

Meanwhile, if the destination physical address of the transmission packet is not present in the management list, the packet transmitter 562 transmits the transmission packet to both of the wired transmitter 514 and the wireless transmitter 534 so that the transmission packet is transmitted to both of the wired and wireless networks 500 and 520 in operation S860. However, it is understood that, instead of transmitting through both transmitters 514, 534, the transmission could be through a default one of the transmitters 514, 534 or through one of the transmitters 514, 534 having the least traffic.

Figure 10:
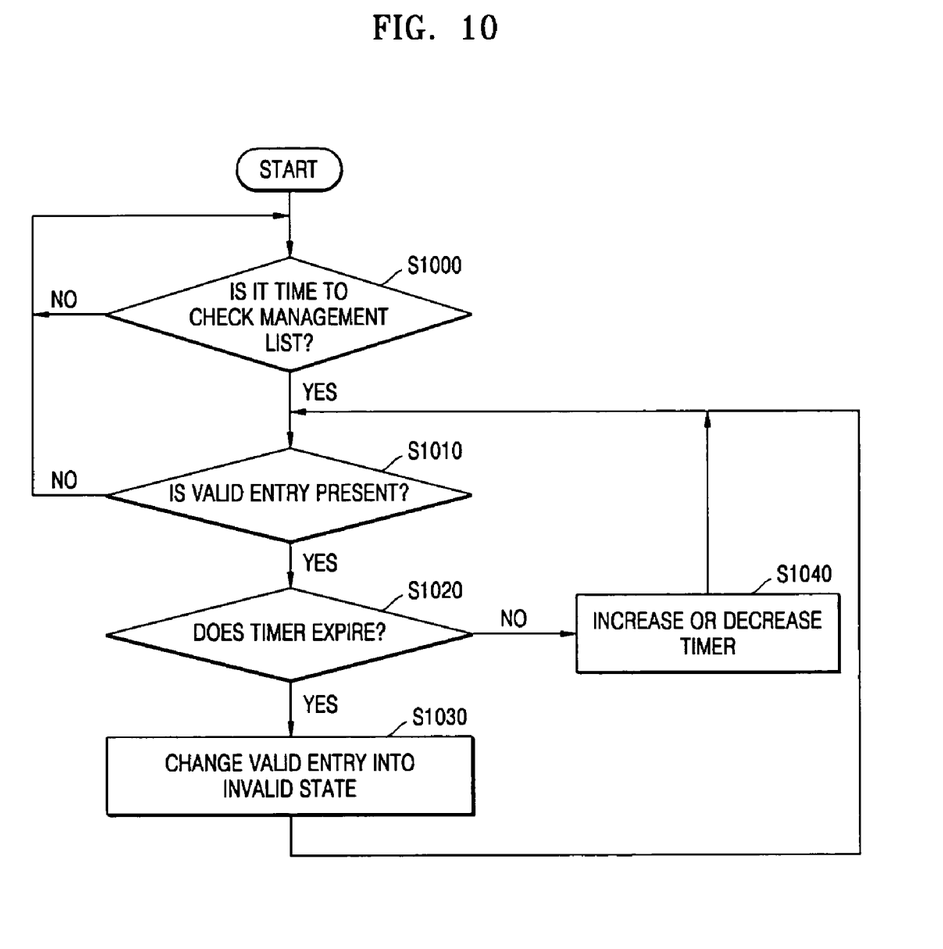
FIG. 10 is a flowchart of an operation of managing an entry in a management list that is performed by a storage unit shown in FIG. 5 according to an embodiment of the present invention.

FIG. 10 is a flowchart of an operation of managing an entry in a management list that is performed by the storage unit 550 according to an aspect of the invention. The storage unit 550 stores the management list. The storage unit 550 periodically checks a timer item in the management list in operation S1000, and determines whether any valid entry is present in the management list in operation S1010.

The storage unit 550 determines whether any valid entry has an expiring timer in operation S1020. If any valid entry has the expiring timer, the storage unit 550 changes the valid entry into an invalid state to indicate an entry which may be removed from the management list in operation 1030. If there is no entry having an expiring timer, any valid entry's timer is increased or decreased in operation S1040. For example, when an initial value of a timer is 20 and a value of 0 denotes expiration of the timer, the timer is decreased by 1. Conversely, when the initial value of the timer is 0 and the value 20 denotes the expiration, the timer is increased by 1. While not shown in FIG. 10, where the timer has expired, the storage unit 550 removes the entry having the expired timer according to an aspect. Additionally, the timer entry can be increased by 1 or reset where the physical address is again received so as to prevent the premature removal of an entry from the management list where the physical address relates to another system with respect to which packets are being transferred.

An aspect of the invention can also be embodied as computer readable codes on a computer readable recording medium or media for use with one or more computers. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

It is understood that, according to an aspect of the invention, the management list can be otherwise updated and can be created by other devices without requiring reception of a packet from a source. Moreover, while shown as having two interfaces 510, 530, it is understood that the management list of an aspect of the present invention can be used with a plurality of interfaces for use in systems having multiple network connections and sharing a common address.

A hybrid wired and wireless communication system according to the present invention uses a single physical address for both of wired and wireless network interfaces, and whenever a packet is received, records a physical address of a source transmitting the packet and an interface number indicating whether a network interface linked to the physical address is wired or wireless in a management list. Thereafter, when a transmission packet generated in an upper layer is transmitted to the physical address in the management list, the hybrid wired and wireless communication system selectively transmits the transmission packet through either of the wired network interface and the wireless network interface according to the interface number linked to the physical address in the management list. Therefore, an aspect of the present invention prevents traffic of one network from being loaded onto another network, thereby preventing dissipation of a bandwidth.

While aspects of the this invention has been particularly shown and described with reference to embodiments thereof, it will be understood by those skilled in the art that various changes in form and details may be made therein without departing from the spirit and scope of the invention as defined by the appended claims. The embodiments should be considered in the descriptive sense only and not for purposes of limitation. Therefore, the scope of the invention is defined not by the detailed description of the invention, but by the appended claims, and all differences within the scope will be construed as being included in the present invention, the scope of which is defined in the claims and their equivalents.

What is claimed is:

1. A hybrid wired and wireless communication apparatus capable of communicating with external sources via a wired network and a wireless network, the apparatus comprising:
   a network interface having a wired network interface portion and a wireless network interface portion, the wired network interface portion configured to receive and transmit packets through the wired network, the wireless network interface portion configured to receive and transmit packets through the wireless network,
   wherein the wired network interface portion is associated with a predefined MAC address for receiving incoming packets having the predefined MAC address, via the wired network, from external sources and the wireless network interface portion is associated with the same predefined MAC address as the wired network interface portion for receiving incoming packets having the predefined MAC address, via the wireless network, from external sources;
   a network driver configured to store a management list comprising a plurality of entries, each of the entries comprising a physical address of an external source transmitting a packet received by the network interface and an identifier information indicating whether the respective external source communicated via the wired network interface portion or the wireless network interface portion;
   a control module configured to process an incoming packet received from the external source via the wired network interface portion or the wireless network interface portion and generate an outgoing packet to be transmitted to the external source, the outgoing packet including a destination physical address,
   wherein, when the outgoing packet generated by the control module is to be transmitted via the network interface, the network driver determines whether the outgoing packet is to be transmitted via the wired network interface portion or the wireless network interface portion according to the identifier information, stored in the management list, indicating whether the respective external source communicated via the wired network interface portion or the wireless network interface portion,
   wherein the wired network interface portion and the wireless network interface portion are associated with the same predefined MAC address such that a first incoming packet received via the wired network interface portion and a second incoming packet received via the wireless network interface portion are received using the same predefined MAC address.

2. The apparatus of claim 1, wherein the outgoing packet is transmitted via the wired network interface portion if it is determined that the destination physical address specified in the outgoing packet matches with the physical address of the external source recorded in one of the entries included in the management list and the corresponding identifier information indicates that the respective external source previously communicated via the wired network interface portion during a recent communication.

3. The apparatus of claim 1, wherein the outgoing packet is transmitted via the wireless network interface portion if it is determined that the destination physical address specified in the outgoing packet matches with the physical address of the external source recorded in one of the entries included in the management list and the corresponding identifier information indicates that the respective external source previously communicated via the wireless network interface portion during a recent communication.

4. The apparatus of claim 1, wherein the wireless network interface portion operates in an ad-hoc mode.

5. The apparatus of claim 1, wherein an entry contained in the management list further includes information indicating a communication status between a corresponding source and the network interface.

6. The apparatus of claim 5, wherein the network driver is configured to delete an entry in the management list after a predetermined time is elapsed, based on the communication status information.

7. The apparatus of claim 1, wherein the network driver determines whether a type of the destination physical address of the outgoing packet indicates a unicast transmission, and determines whether the destination physical address specified in the outgoing packet matches with any of the entries in the management list, when the type of the destination physical address indicates the unicast transmission.

8. The apparatus of claim 1, wherein the network driver transmits the outgoing packet via both the wired network interface and the wireless network interface if none of the entries in the management list matches with the destination physical address of the outgoing packet.

9. The apparatus of claim 1, wherein the wired network interface portion is associated with the predefined MAC address for transmitting outgoing packets having the predefined MAC address to external sources and the wireless network interface portion is associated with the same predefined MAC address as the wired network interface portion for transmitting outgoing packets having the predefined MAC address to external sources.

10. The apparatus of claim 9, wherein a source destination address of the outgoing packets transmitted via the wired network interface portion and a source destination address of the outgoing packets transmitted via the wireless network interface portion are the same predefined MAC address associated with both the wired network interface portion and the wireless network interface portion.

* * * * *